(12) United States Patent
Albrecht

(10) Patent No.: US 7,637,699 B2
(45) Date of Patent: Dec. 29, 2009

(54) STEAM/WATER CONICAL CYCLONE SEPARATOR

(75) Inventor: Melvin J. Albrecht, Homeworth, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 90 days.

(21) Appl. No.: 11/753,335

(22) Filed: Jul. 5, 2007

(65) Prior Publication Data

US 2009/0010721 A1 Jan. 8, 2009

(51) Int. Cl.
*B65G 53/60* (2006.01)

(52) U.S. Cl. ..................... 406/173

(58) Field of Classification Search ..... 55/459.1–459.5; 406/173; 210/512.1
See application file for complete search history.

(56) References Cited

U.S. PATENT DOCUMENTS

| | | | |
|---|---|---|---|
| 418,834 A | 1/1890 | Arlington et al. | |
| 2,271,634 A | 2/1942 | Fletcher et al. | |
| 2,293,740 A | 8/1942 | Kooistra | |
| 2,298,285 A | 10/1942 | Fletcher | |
| 2,321,628 A | 6/1943 | Rowand et al. | |
| 2,346,672 A | 4/1944 | Fletcher | |
| 2,395,855 A | 3/1946 | Fletcher | |
| 2,402,154 A | 6/1946 | Fletcher | |
| 2,434,637 A | 1/1948 | Brister | |
| 2,434,663 A | 1/1948 | Letvin | |
| 2,434,677 A | 1/1948 | Stillman | |
| 2,532,332 A | 12/1950 | Rowand | |
| 2,732,028 A | 1/1956 | Coulter | |
| 2,891,632 A | 6/1959 | Coulter | |
| 3,884,069 A * | 5/1975 | Lind | 73/861.32 |
| 3,885,933 A | 5/1975 | Putney | |
| 4,344,538 A * | 8/1982 | Fujisawa et al. | 209/719 |
| 4,848,991 A | 7/1989 | Bielefeldt | |
| 4,927,298 A | 5/1990 | Tuszko et al. | |
| 5,033,915 A | 7/1991 | Albrecht | |
| 5,129,930 A * | 7/1992 | Gauthier et al. | 55/394 |
| 5,186,836 A * | 2/1993 | Gauthier et al. | 210/512.1 |
| 5,302,775 A * | 4/1994 | Hugues et al. | 585/639 |
| 5,536,289 A * | 7/1996 | Spies et al. | 55/459.5 |
| 5,771,844 A * | 6/1998 | Dietz | 122/4 D |
| 5,961,701 A * | 10/1999 | Hlynsky | 96/209 |
| 6,596,046 B2 * | 7/2003 | Conrad et al. | 55/345 |
| 7,323,038 B2 * | 1/2008 | Reiling | 95/271 |
| 2005/0126394 A1 * | 6/2005 | Reiling | 95/271 |
| 2006/0130444 A1 * | 6/2006 | Smith et al. | 55/345 |

OTHER PUBLICATIONS

Steam/its generation and use, 1972, pp. 1-5-1-9, 38th Edition, Babcock & Wilcox, New York, NY, USA.
Kitto et al., Steam/its generation and use, 2005, pp. 5-13-5-17, 41st Edition, The Babcock & Wilcox Company, Barberton, OH, USA.

* cited by examiner

*Primary Examiner*—Gene Crawford
*Assistant Examiner*—William R Harp
(74) *Attorney, Agent, or Firm*—Michael J. Seymour; Eric Marich

(57) ABSTRACT

A conical cyclone separator for separating steam from water in a steam/water mixture supplied to a steam drum of a boiler. A widened tangential inlet extends the axial length of the conical portion of the separator, increasing the width of the inlet while causing no derogation in steaming capacity and substantially lowering pressure drop. The inlet design of this separator is compatible with smaller diameter steam drums unable to currently utilize conventional separators.

3 Claims, 9 Drawing Sheets

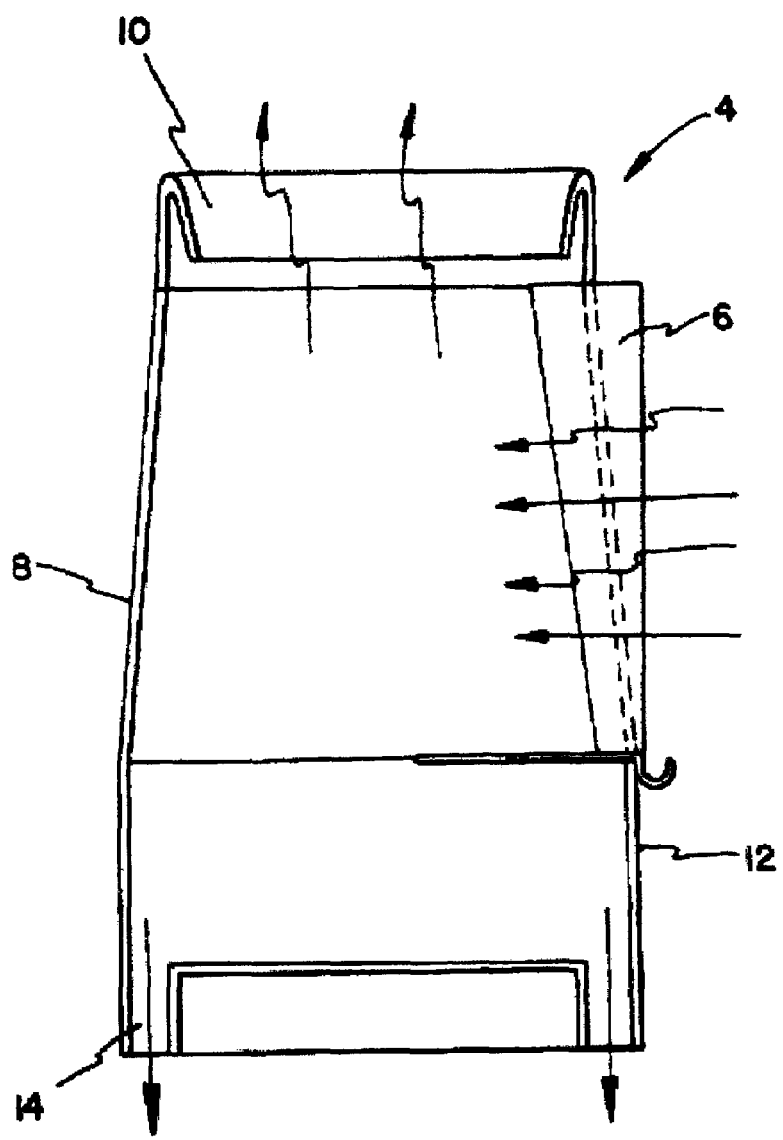
FIG. 1 - Prior Art

FIG. 2 - Prior Art
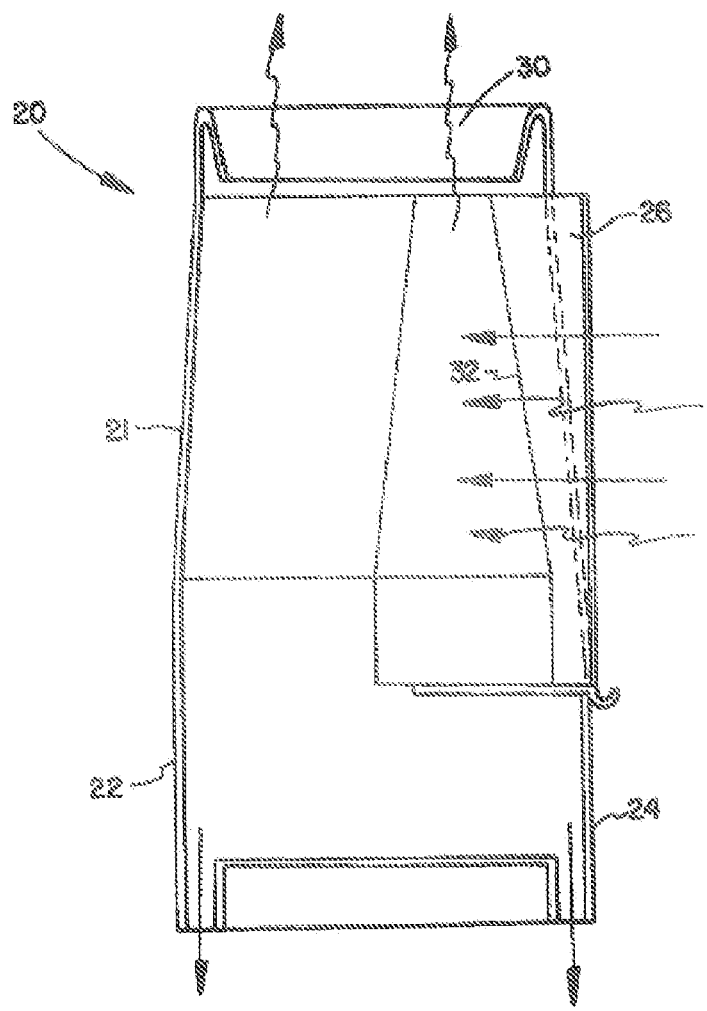
FIG. 3 - Prior Art
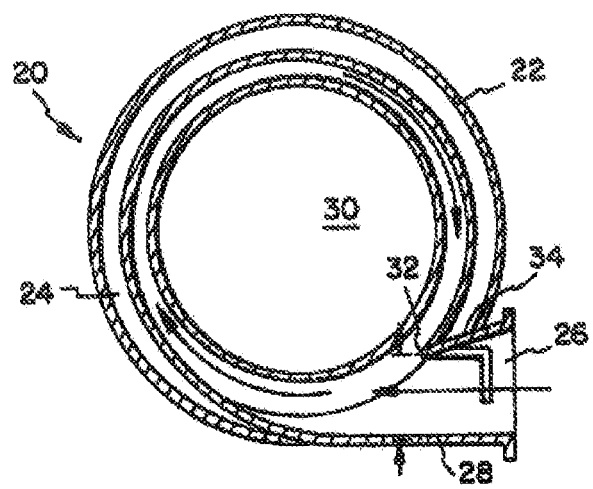

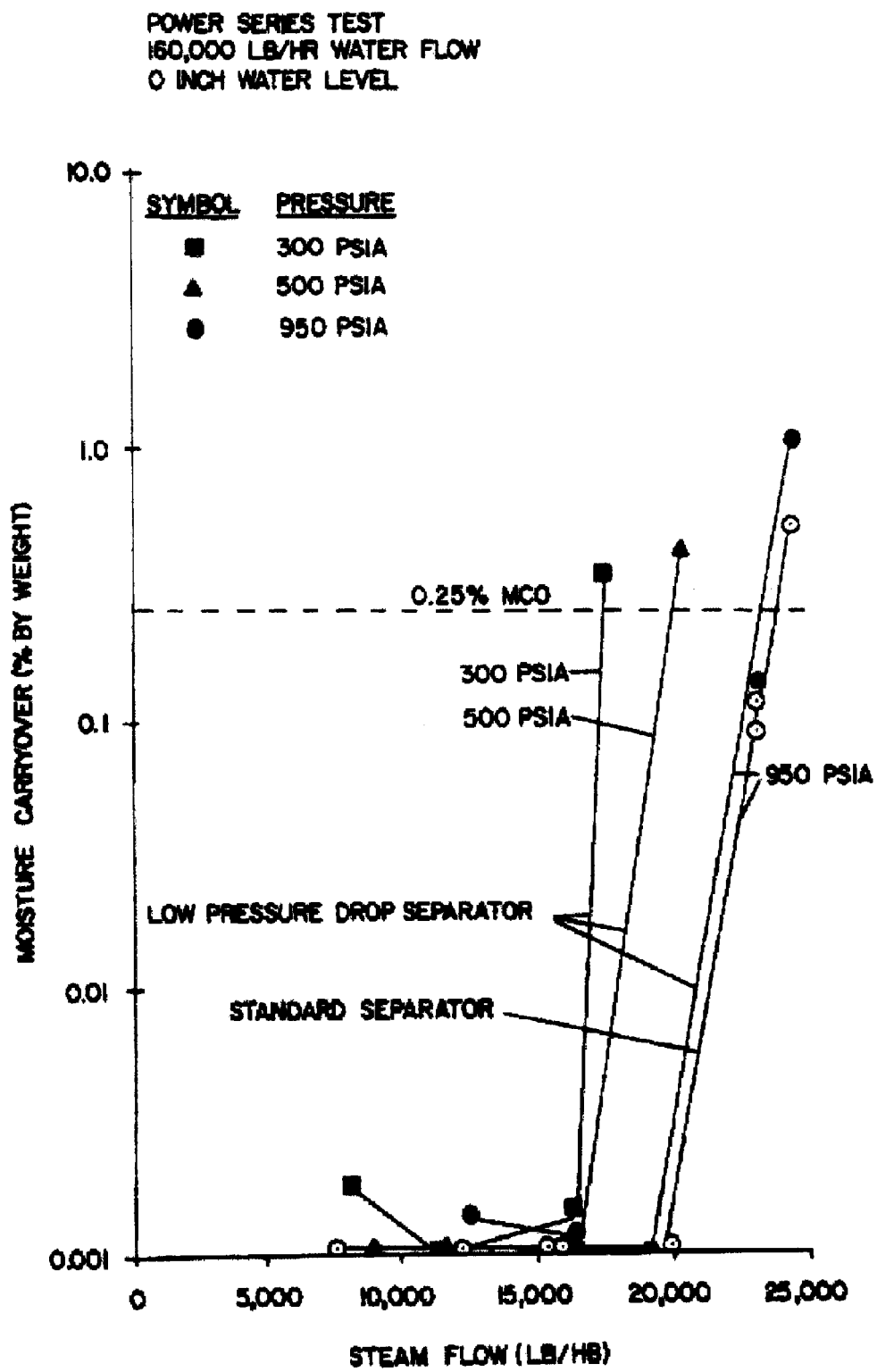
FIG. 6A - Prior Art

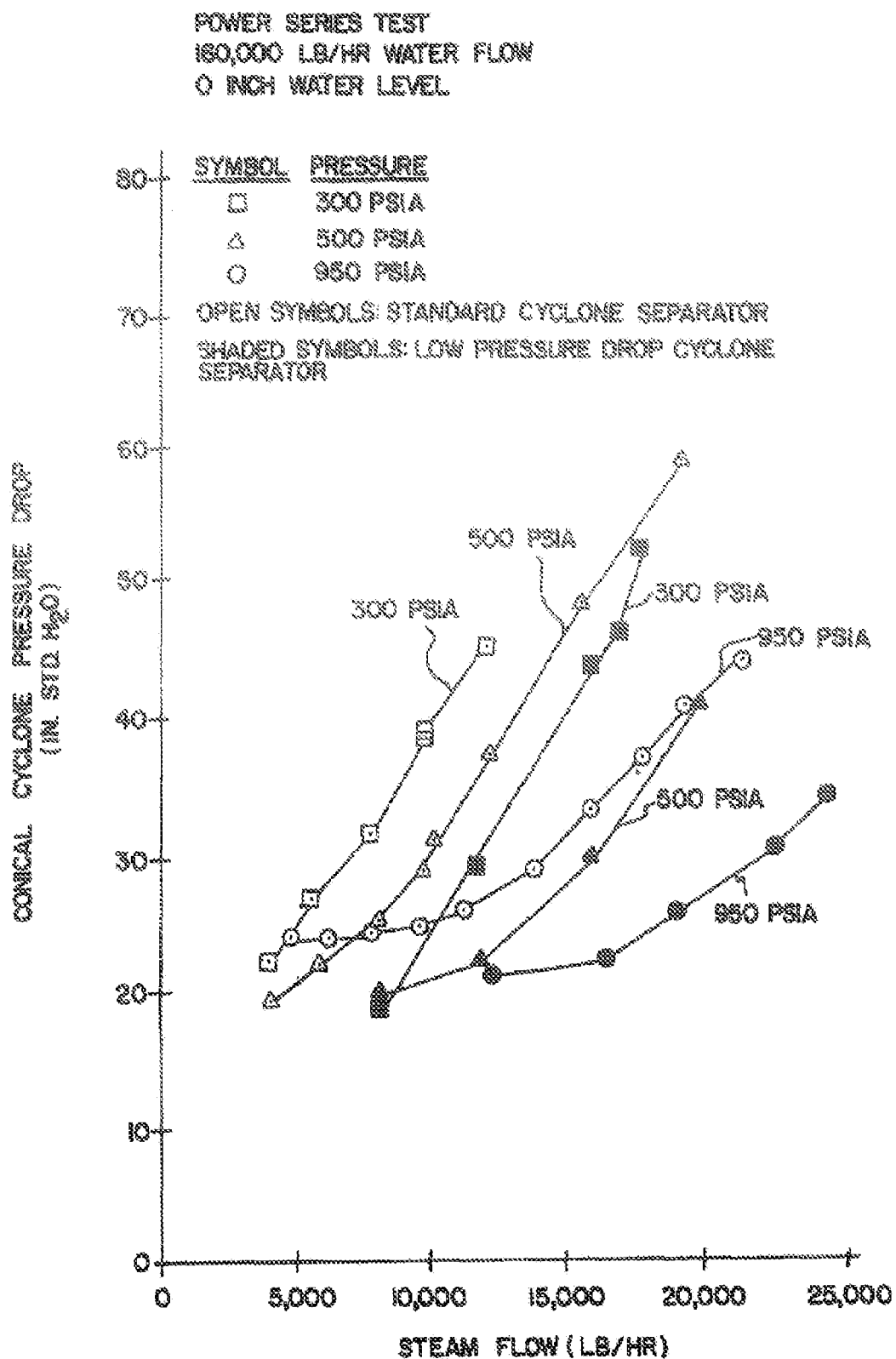
FIG. 7A - Prior Art

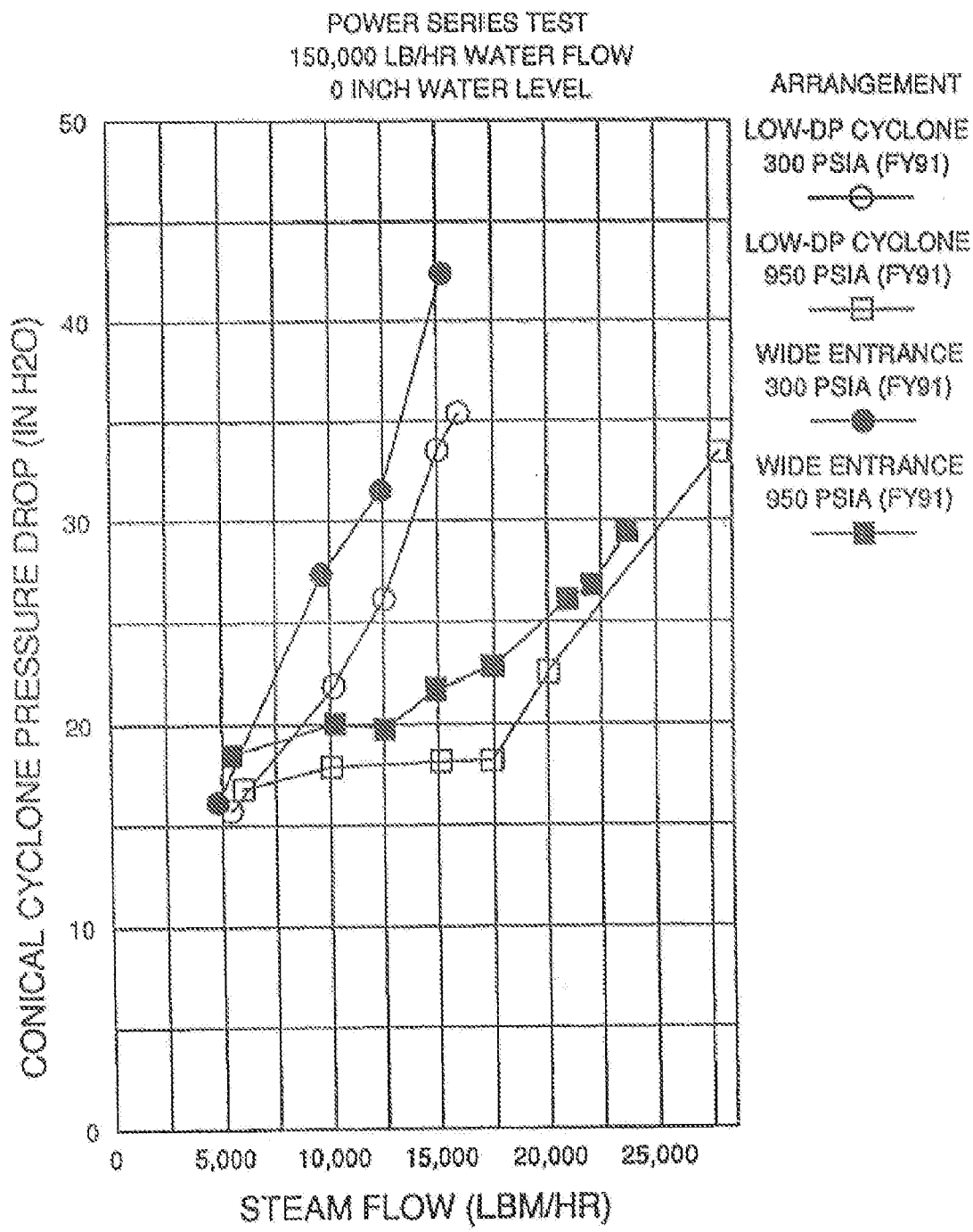

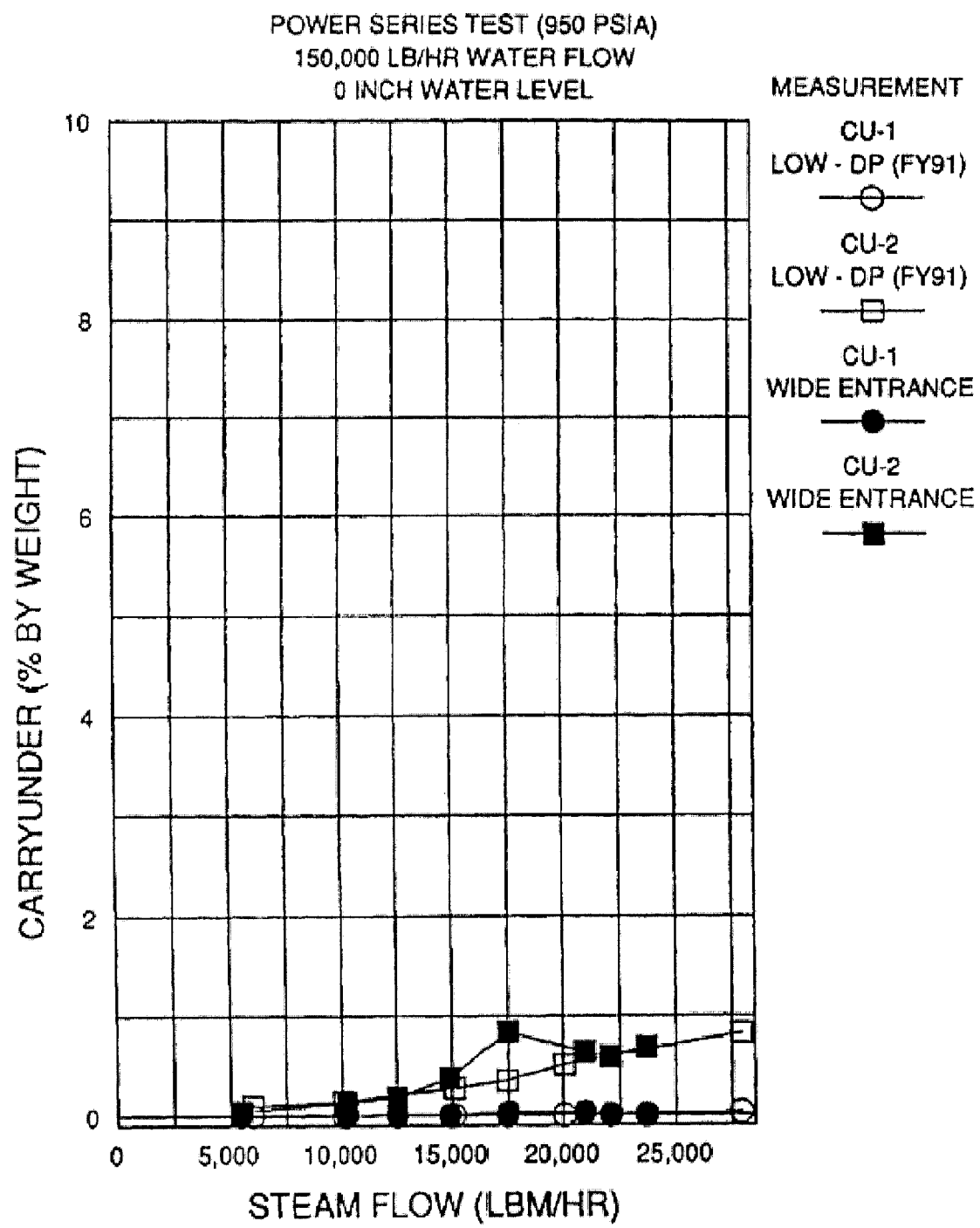

TOP VIEW          SIDE VIEW

STEAM/WATER CONICAL CYCLONE SEPARATOR

FIELD AND BACKGROUND OF THE INVENTION

The present invention relates in general to cyclone separators for separating steam from water, in the steam drum of a boiler.

U.S. Pat. No. 2,271,634 to Fletcher discloses a cylindrical cyclone separator having a circular whirl chamber, a tangential inlet, a central steam outlet located at the top of the circular whirl chamber, and a water outlet located at the bottom of the whirl chamber. To prevent water from being discharged through the steam outlet, means are provided for increasing the downward component of the incoming stream of steam and water mixture. This means is a segmented plate having downwardly and rearwardly inclined edges that causes the incoming steam and water mixture to be deflected downwardly towards the water outlet of the separator.

U.S. Pat. No. 2,293,740 to Kooistra discloses a similarly designed cyclone separator that does not utilize the segmented plate but rather employs a bottom cup at the bottom of the whirl chamber which confines the steam to the upper portion of the whirl chamber and prevents it from passing down into the separated water as it discharges from the whirl chamber, into the drum.

U.S. Pat. No. 2,298,285 to Fletcher discloses another variation of the cylindrical cyclone separator this time employing a rim or cap on top of the cyclone separator steam outlet together with the segmented plate. The rim acts to enhance separation of water and reduction of pressure drop in the separator.

U.S. Pat. No. 2,321,628 to Rowand et al. discloses a cyclone separator which is closer in configuration to the present standard shown in FIG. 1 of the present application. The circulator whirl chamber in this reference is the frustum of a cone at the upper portion and substantially cylindrical at the lower portion where the water is discharged. Again, a tangential inlet is employed to deliver the steam water mixture into the cyclone separator, and is of a vertical extent substantially equal to that of the tapered portion of the whirl chamber. The tapered configuration acts to direct the entering steam water mixture into a slightly downward direction to prevent upward spread of the deflected water and enhance separation of the steam therefrom.

U.S. Pat. No. 2,346,672 to Fletcher discloses a substantially cylindrical cyclone separator this time having instead of a tangential inlet a large steam/water inlet which extends over a large fraction of the perimeter of the cyclone separator. As indicated in the reference, the inlet can extend to approximately ⅓ of the perimeter of the cyclone separator to provide adequate flow capacities. One object is to produce a separator or densifier which operates effectively with low pressure drop so that it can be advantageously used where only a small pressure head is available.

U.S. Pat. No. 2,395,855 to Fletcher discloses a substantially cylindrical cyclone separator having a tangential inlet and where the steam outlet center is located eccentric of the whirl chamber center to effect enhanced separation of steam from the water. This design also employs the segmented plate seen in the previously described patents.

U.S. Pat. No. 2,402,154 to Fletcher and the aforementioned U.S. Pat. No. 2,395,855 are both divisionals of the same application. The U.S. Pat. No. 2,395,855 is drawn to the particular type of fluid separator itself; while the U.S. Pat. No. 2,402,154 is drawn to the combination of this device in a steam generator.

U.S. Pat. No. 2,434,637 to Brister, U.S. Pat. No. 2,434,663 to Letvin and U.S. Pat. No. 2,434,677 to Stillman are all drawn to various aspects of the perforated cone used at the top of the cyclone separator to enhance separation of the steam from the water.

U.S. Pat. No. 2,532,332 to Rowand is drawn to the particular construction of the separators which today are generally considered as secondary scrubbers.

U.S. Pat. No. 2,732,028 to Coulter is also drawn to a cyclone separator device very similar to that employed at this time. The cyclone separator has the aforementioned frustoconical upper section and generally cylindrical lower section with a tangential steam water inlet located on the side of the frustoconical section. The overall emphasis of this reference is drawn to means of simplifying the construction for accessibility and repair of the elements located in the steam drum. This is accomplished by dividing the steam space in the drum into separate compartments, one or more of which are open to the water space of the drum into the necessary drum safety valves while one or more of the other compartments are open to the steam and water separators of the drum the saturated steam outlets. Partitions are used to accomplish this division and they are effective in maintaining the separation of the drum components during normal operation but are easily broken when the safety valves are opened.

U.S. Pat. No. 2,891,632 to Coulter is drawn to a cyclone steam separator quite similar to that disclosed in the earlier mentioned Fletcher patent (U.S. Pat. No. 2,346,672) with the exception that instead of the steam water inlet being located only approximately along ⅓ of the circumference of the separator, this cyclone separator has the entire circumference provided with an array of vanes that "slice" the incoming steam water mixture into thin sheets to enhance separation of the steam from the water.

U.S. Pat. No. 5,033,915 to Albrecht is also drawn to a cyclone steam separator. The cyclone separator is a modified version of the standard conical cyclone separator that provides a lower pressure drop than the standard conical cyclone for an equivalent number of or an equivalent steam capacity of the separators. The major modification of this separator is that the cyclone separator's tangential inlet has been lengthened by 3 inches. This increase in length increases the cyclone inlet flow area by 28%.

FIG. 1 is a side sectional view of a conventional cyclone separator which is in current use by the assignee of the present application.

The conventional cyclone separator is generally designated 4 and comprises a conical portion 8 to which a vertically elongated tangentially connected steam/water inlet 6 is connected. The inlet 6 corresponds in axial length to the axial length of the conical portion 8.

Cyclone separator 4 includes an upper cylindrical steam outlet 10 which, in use, is surrounded by a cap with a perforated cover (not shown).

A lower cylindrical water outlet 12, having a water outlet ring 14, is connected to the bottom of conical portion 8 for discharging water which has been separated from the steam/water mixture.

The conventional cyclone separator of FIG. 1 could be improved by decreasing its pressure drop without adversely affecting the capacitor of the separator.

FIG. 2 is a side sectional view of a cyclone separator 20 described in U.S. Pat. No. 5,033,915. The cyclone separator 20 includes a tangential inlet 26 which extends into the lower cylindrical portion 22 of the cyclone separator 20. Steam that passes through the cyclone separator 20 is discharged through the upper cylindrical steam outlet 30. A lower cylindrical portion 22 having a ring shaped water outlet 24, is connected to the bottom of conical portion 21 for discharging water which has been separated from the steam/water mixture. The width of the inlet 26 of the cyclone separator 20 is defined by tangential outer wall 28 and the inner edge 32 of an inner wall 34.

SUMMARY OF THE INVENTION

The present invention seeks to improve the cyclone separator of FIG. 1 by decreasing its pressure drop without adversely affecting its capacity. The present invention also seeks to provide an evaluate performance of the cyclone separator of FIG. 2 and 3 while allowing the device to be installed in smaller diameter steam drums.

The present invention is a modified conical cyclone separator for applications that require a lower pressure drop than the standard conical cyclone would give, for an equivalent number of or an equivalent steam capacity of the separators. The new conical cyclone gives increased capacity for both steam and water, lower pressure drop and is unaffected by water lever fluctuations. This new type of low pressure drop conical cyclone separator is a modified version of the standard conical cyclone separator and a shorter length design of the low pressure conical cyclone separator given in FIGS. 2 and 3. The major difference this separator and the standard conical cyclone separator is that the new cyclone separator's tangential inlet has been widened by 7/16 inches. This increase in length increases the cyclone inlet flow area by 28%.

The widening of the tangential inlet extends the horizontal inlet configuration into the conical portion of the cyclone separator while maintaining the same length as the standard conical cyclone. This differs from the low pressure drop cyclone separator given in FIGS. 2 and 3. The low pressure drop cyclone had a lengthened tangential inlet and a resulting longer overall length. The present invention will provide a conical cyclone separator that will have the same overall length as the standard conical cyclone separator and an equivalent flow area of the low pressure drop conical cyclone separator. Thus, the overall space envelope the cyclone separator of the present invention occupied in the steam drum is kept substantially the same as a standard conical cyclone.

In the conventional cyclone separator of FIG. 1, the axial length of the conical portion of the separator, and also the coextensive axial length of the inlet, amounts to approximately ½ to total height of the separator. In accordance with the present invention, the axial length of the inlet will remain the same but the horizontal length of the inlet will increase by approximately 7/16 inch which amounts to approximately 28% increase in the flow area of the inlet opening and an increase of the total width of the separator inlet of approximately 16%.

This modification has been found to substantially decrease the pressure drop of the separator when compared to the standard separator without adversely affecting the capacity of the separator. The modification has also been shown to be approximately as effective as the low pressure drop cyclone separator in FIGS. 2 and 3 in achieving decreased pressure drop without adversely affecting the capacity of the separator. The major benefit of this invention is the ability to incorporate a lower pressure drop cyclone separator into steam drum which cannot accept the longer length of the low pressure drop cyclone separator given in FIGS. 2 and 3.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

BRIEF DESCRIPTION OF THE DRAWINGS

In the drawings:

FIG. 1 is a vertical sectional view of a conventional conical cyclone separator;

FIG. 2 is a low pressure drop cyclone separator described in U.S. Pat. No. 5,033,915;

FIG. 3 is a horizontal sectional view of the separator shown in FIG. 2;

FIG. 6A is a graph showing moisture carryover versus steam flow for the conventional cyclone separator and the low pressure drop separator described in U.S. Pat. No. 5,033,915;

FIG. 7A is a graph showing conical cyclone pressure drop versus steam flow for the conventional cyclone separator and the low pressure drop conical cyclone separator described in U.S. Pat. No. 5,033,915;

FIG. 7B is a graph showing conical cyclone pressure drop versus steam flow for the conventional cyclone separator and the regular length low pressure drop cyclone separator of the present invention;

FIG. 8 is a graph showing moisture carryover versus steam flow for the conventional cyclone separator and the regular length low pressure drop cyclone separator;

DESCRIPTION OF THE PREFERRED EMBODIMENT

Figure 4:
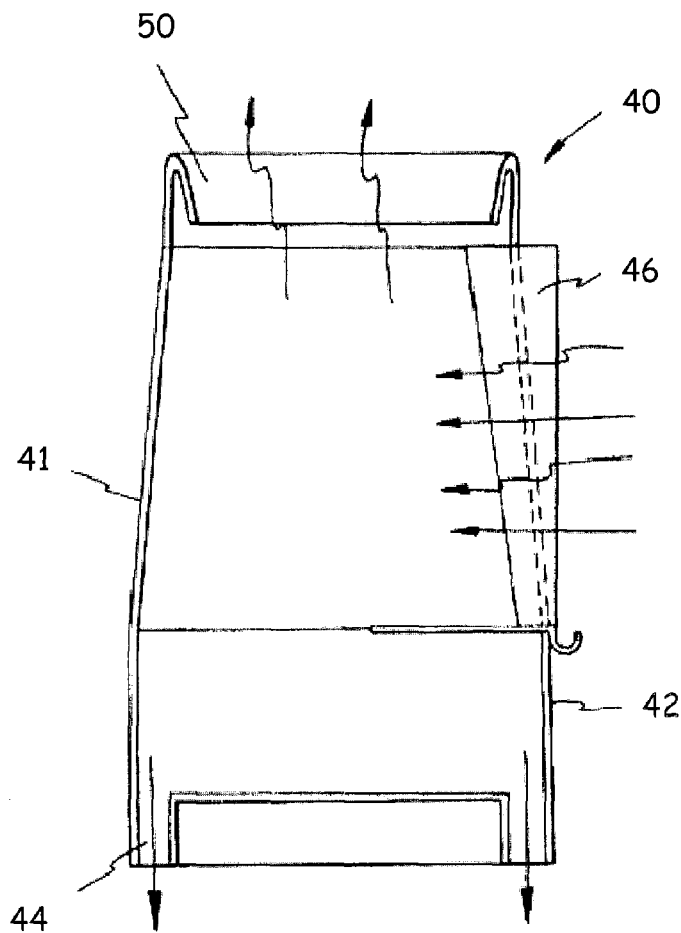
FIG. 4 is a vertical sectional view of a cyclone separator of the present invention.
Figure 5:
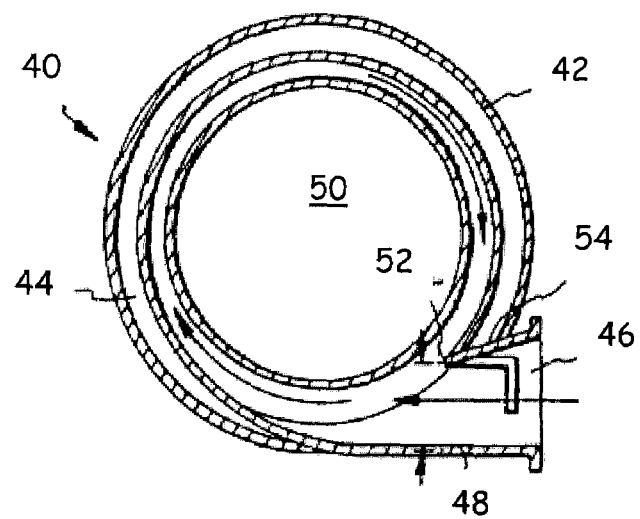
FIG. 5 is a horizontal sectional view of the separator shown in FIG. 4.

Referring to the drawings in particular, wherein like reference numerals designate the same or functionally similar elements throughout the several drawings, and to FIGS. 4 and 5 in particular, the invention embodied in FIGS. 4 and 5 comprises a conical cyclone separator generally designated 40 which is mounted within a steam drum (not shown). Preferably, the cyclone separator 40 is adapted for mounting inside a steam drum that has an inside diameter of less than 60 inches.

The purpose of a cyclone separator is to improve the efficiency of separation between steam and water in a steam/water mixture, by swirling the mixture at high velocity around the interior of the separator. The greater mass of the water causes it to move to the outside of the swirling stream leaving a concentration of steam which is discharged through the upper cylindrical outlet 50. From outlet 50, the steam is further separated and treated by conventional scrubbers and other equipment (not shown).

The water which has been removed from the mixture is discharged through a lower cylindrical portion 42 and a ring shaped water outlet 44 at the bottom of the separator 40. The separator 40 includes a main conical portion 41.

Figure 9A:
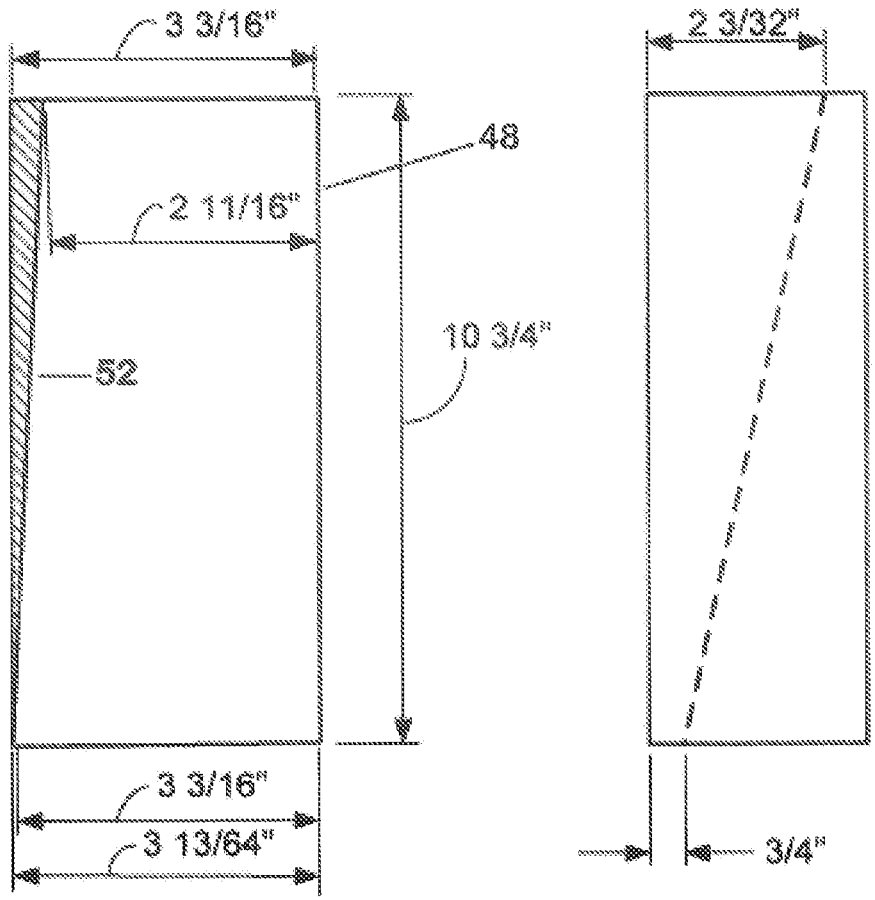
FIG. 9A is a tangential inlet of a cyclone separator of the present invention.
Figure 9B:
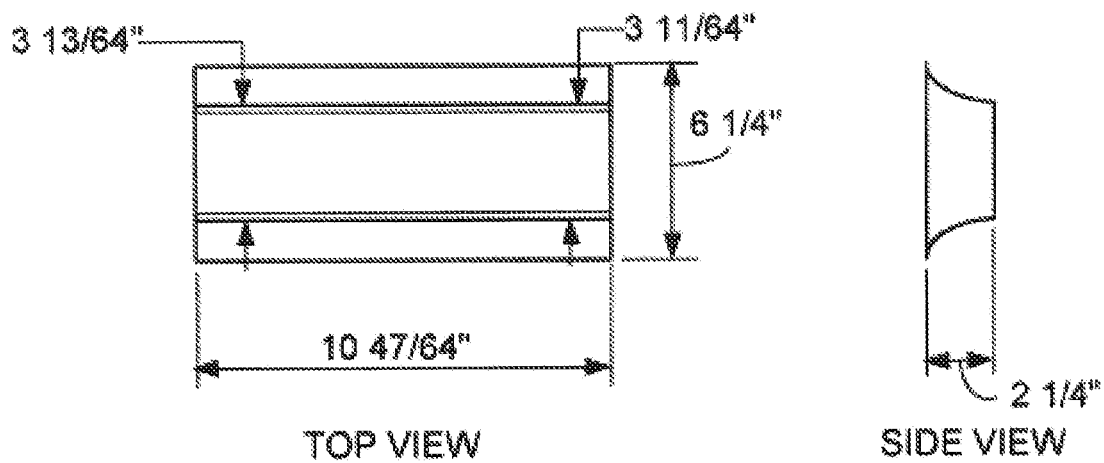
FIG. 9B is a connector box for connecting the tangential inlet shown in FIG. 9A to, e.g., a saturated steam line.

An axially elongated tangentially connected steam/water inlet 46 is connected to the separator. As best shown in FIG. 5, the tangential opening between the inlet 46 and the interior of separator 40, amounts to approximately ⅓ of the circumference of the separator 40. As with the separators illustrated in FIGS. 1, 2 and 3, the separator 40 of FIGS. 4 and 5 has a maximum inside diameter of approximately 11.5 inches, with the inlet 46 having a width, in the upper horizontal section, of 2$\frac{11}{16}$ inches between a tangential outer wall 48 and the inner edge 52 of an inner wall 54. Also see FIG. 9A. According to the present invention, the width to height ratio for the inlet 46 is thus approximately 1:4. In the conventional separator of FIG. 1, this ratio is approximately 1:5 and for the low pressure drop separator of FIGS. 2 and 3, this ratio is approximately 1:6.5

In an embodiment, an axial length of the inlet 46 is about ½ of the axial length of the housing or cyclone separator 40.

Extensive tests have been conducted to compare the performance of the new conical cyclone separator 40 of FIGS. 4 and 5, from the performance of the conventional separator of FIG. 1 and the low pressure drop separator of FIGS. 2 and 3.

Figure 6B:
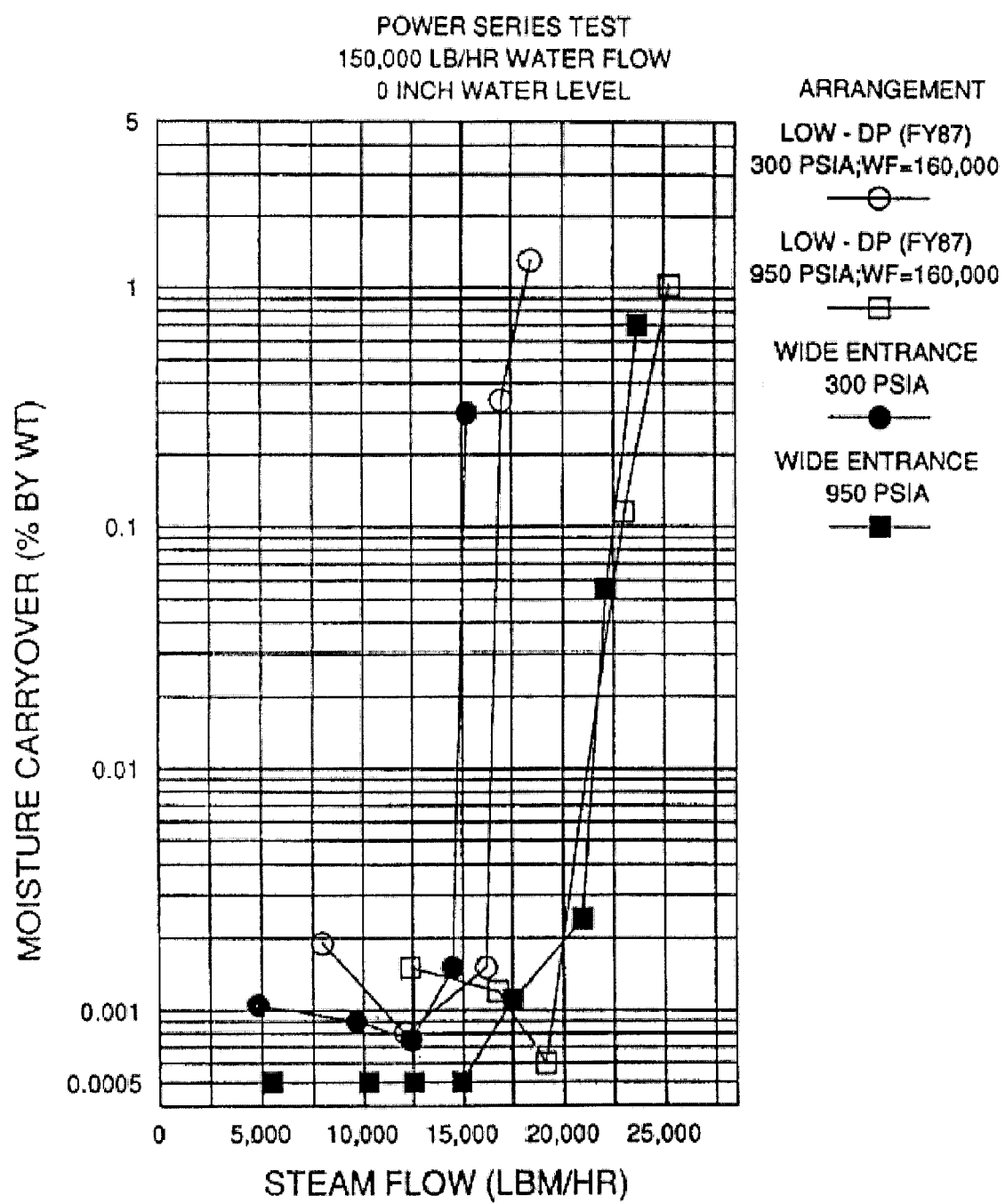
FIGS. 6B is a graph showing moisture carryover versus steam flow for the conventional cyclone separator and the regular length low pressure drop cyclone separator of the present invention.

In FIGS. 6-8, the performance of the low pressure drop cyclone separator 40 of the present invention is compared to the standard cyclone separator and the taller low pressure drop separator shown in FIGS. 2 and 3. As shown in FIG. 6, the steam flow capacity for the separators is the same. In FIG. 6, depending upon flow and pressure conditions, the reduction in pressure drop can range between 25% to 40%.

Based upon the data shown in FIGS. 6-8, performance of the new low pressure conical cyclone separator 40 has been formulated as follows: (1) steam capacity is the same as the standard 11.5 inch ID conical cyclone separator, and (2) the pressure drop is 30% less than the standard 11.5 inch ID conical cyclone separator.

According to the present invention, thus a relatively simple modification yields substantially improved results in an unexpected manner.

While a specific embodiment of the invention has been shown and described in detail to illustrate the application of the principles of the invention, it will be understood that the invention may be embodied otherwise without departing from such principles.

I claim:

1. A cyclone separator for separating steam from water in a steam/water mixture, comprising:

a separator housing having a conical portion with an axial length, an upper edge and a lower edge, an upper cylindrical steam outlet portion connected to the upper edge of the conical portion and having a central opening for discharging steam from the housing;

a lower cylindrical water outlet portion having a bottom water outlet ring for discharging water from the housing; and an axially elongated steam/water mixture inlet connected tangentially to the housing, the inlet having a width to height ratio of approximately 1:4, an axial length amounting to approximately 50% of the axial length of the housing, the inlet includes an outer tangential wall and an inner wall having an inner edge, the inlet having a upper width between the outer wall and the inner edge of approximately 2$\frac{11}{16}$ inches and a lower width greater in width than the upper width, and wherein the inlet extends the full axial length of the conical portion ending at the lower cylindrical portion.

2. A cyclone separator for separating steam from water in a steam/water mixture, comprising:

a separator housing having a conical portion with an axial length, an upper edge and a lower edge, an upper cylindrical steam outlet portion connected to the upper edge of the conical portion and having a central opening for discharging steam from the housing;

a lower cylindrical water outlet portion having a bottom water outlet ring for discharging water from the housing, the housing having a maximum inside diameter of 11.5 inches; and an axially elongated steam/water mixture inlet connected tangentially to the housing, the inlet having a width to height ratio of approximately 1:4, an axial length amounting to approximately 50% of the axial length of the housing, the inlet includes an outer tangential wall and an inner wall having an inner edge, the inlet having a upper width between the outer wall and the inner edge of approximately 2$\frac{11}{16}$ inches and a lower width greater in width than the upper width, and wherein the inlet extends the full axial length of the conical portion ending at the lower cylindrical portion.

3. A cyclone separator for separating steam from water in a steam/water mixture, comprising:

a separator housing having a conical portion with an axial length, an upper edge and a lower edge, an upper cylindrical steam outlet portion connected to the upper edge of the conical portion and having a central opening for discharging steam from the housing; and a lower cylindrical water outlet portion having a bottom water outlet ring for discharging water from the housing, the housing having a maximum inside diameter of 11.5 inches, and an axially elongated steam/water mixture inlet connected tangentially to the housing, the inlet having a width to height ratio of approximately 1:4, and wherein the inlet extends the full axial length of the conical portion ending at the lower cylindrical portion, and wherein the inlet includes an outer tangential wall and an inner wall having an inner edge, the inlet having a upper width between the outer wall and the inner edge of approximately 2$\frac{11}{16}$ inches and a lower width greater in width than the upper width.

* * * * *